(12) United States Patent
Tinoco (10) Patent No.: US 7,889,860 B2
(45) Date of Patent: Feb. 15, 2011

(54) SECURABLE CRADLE FOR HANDHELD DEVICES

(75) Inventor: Joseph Ignacio Tinoco, Seattle, WA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 11/613,472

(22) Filed: Dec. 20, 2006

(65) Prior Publication Data

US 2008/0149798 A1   Jun. 26, 2008

(51) Int. Cl.
*H04M 1/00* (2006.01)
*H04M 9/00* (2006.01)

(52) U.S. Cl. ...................... 379/455; 379/446
(58) Field of Classification Search .......... 379/445, 379/446, 454, 455; 224/553, 539; 296/37.8, 296/24.34

See application file for complete search history.

(56) References Cited

U.S. PATENT DOCUMENTS

| | | | |
|---|---|---|---|
| 4,640,542 A * | 2/1987 | Watjer et al. | 296/37.8 |
| 5,333,176 A * | 7/1994 | Burke et al. | 455/557 |
| 5,349,637 A * | 9/1994 | Miller | 379/445 |
| 5,836,496 A | 11/1998 | Levin | |
| 6,929,304 B1 * | 8/2005 | Dry et al. | 296/37.8 |
| 6,993,368 B2 * | 1/2006 | Schlegel | 455/569.2 |
| 7,413,229 B2 * | 8/2008 | Kukucka et al. | 296/24.34 |

* cited by examiner

*Primary Examiner*—Fan Tsang
*Assistant Examiner*—Phylesha Dabney
(74) *Attorney, Agent, or Firm*—Ostrager Chong Flaherty & Broitman P.C.

(57) ABSTRACT

A device for stowing and deploying a handheld device such as a telecommunications handset within an aircraft or other vehicle has a housing, a pivoting cradle attached to the inner surface of the housing, means for limiting the range of permitted pivoting motion of the cradle within the housing, optional biasing means such as a coil spring between the housing and the pivoting cradle, and means for mounting the housing to a secure place in the aircraft. The cradle has an elongate base with a handset receiving section, and a pivoting mount affixed or integrally molded on each side of the housing. The symmetrical pivoting mount may be a series of at least two slots arrayed in a radius from the geometric pivot point, i.e., the axis of rotation of the handset cradle. The slots engage a complementary series of pins affixed to the housing and which effectively permit a limited range of pivoting motion sufficient to allow secure stowage of the handset under severe linear inertial forces while also permitting easy storage and retrieval as desired by a user.

19 Claims, 7 Drawing Sheets

SECURABLE CRADLE FOR HANDHELD DEVICES

TECHNICAL FIELD

The present invention relates to cradles for handheld devices such as aircraft telecommunications devices and more specifically to securable handset cradles.

BACKGROUND

Proliferation of telecommunications and similar handheld devices within an aircraft has created the need for convenient and secure storage and usage of such handsets. Telecommunications handsets typically include phone sets, portable phones, radios, pagers, remote controllers and the like, which are either connected by a cord to a base unit or which are wireless. Other handheld devices, which must be securely stowed but ready for immediate access, include flashlights, hand tools and cups.

For such devices, it is very important that the handheld devices are easily removable from the storage device, since there may be immediate need by a wide variety of potential users. Unless the context requires otherwise, it is intended that the following descriptions apply interchangeably to handheld devices and handsets, including telecommunications handset in particular.

Various telecommunications and other storage approaches have been developed in the field but these have a variety of shortcomings overcome by the present design, particularly the capability to securely retain a handset within the cradle while undergoing expected and severe inertial force loads.

For example, flight attendant handsets are required in multiple locations within the airplane and must be easily stowed and retrieved, yet sufficiently secure to avoid being dislodged by inertial loads experienced during normal operations, turbulence, or emergency landings. These loads can be quite severe at times. For example, to certify an installation of an attendant seat, the handset must be retained while enduring a static load in the forward direction of up to 24 g.

This has resulted in prior handset cradle design solutions which require fairly high forces for handset stowage and retrieval. Additionally, because of these high forces, there may be an increased risk that flight attendants experience muscle and joint discomfort from using conventional handset cradles. Conventional designs use springs exerting stowage forces of as much as 5 pounds. Whereas the present design is effective using a pound or less force for stowage or retrieval purposes.

Previous cradle designs have used clamping or sliding actions where the cradle tightly grasps the handset. This typically requires a fairly high spring force to retain the handset, making the retrieval or stowage of the handset somewhat difficult.

In contrast to previous designs, the present handset cradle retains the handheld device under all required inertial loads while allowing quick, easy stowage and retrieval of the hand held device by the cabin attendant. This new design greatly reduces the forces needed by taking advantage of the fact that linear inertial forces through a pivot point do not induce a rotational motion which could inadvertently dislodge the handset from the cradle.

Furthermore, the present design reduces the risk of discomfort from using cradled phones and similar devices on aircraft and other vehicles by minimizing or eliminating the force needed to lock or release the handset and cradle.

It will be apparent that the present design will be useful in a variety of transportation applications including automotive or marine, and wherever a handset or similar device needs to be retained under various inertial loads. In each instance the cradle device will provide an improved method of retention over current designs.

SUMMARY OF THE INVENTION

The present invention provides a device for holding and displaying a handset such as a telecommunications handset within an aircraft or other vehicle. The device has a housing, a pivoting cradle attached to an inner surface of the housing, means for limiting the range of permitted pivoting motion of the cradle within the housing, biasing means such as a coil spring to impress a light retention force between the housing and the pivoting cradle and means for mounting the housing to a secure place in the aircraft.

The cradle has an elongated base member with a handset receiving section, a pivoting mount affixed or integrally molded on a first side of the base member, and a second, symmetrical pivoting mount affixed or integrally molded on an opposite second side of the base member. The symmetrical pivoting mount may be a series of at least two slots arrayed in a radius from the geometric pivot point, i.e., the axis of rotation of the handset cradle. The slots engage a complementary series of pins affixed to the housing which effectively permit a limited range of pivoting motion.

The housing is generally sleeve-shaped with one end open for inserting a handset into the device for storage. The handset is stowed upon a pivoting cradle within the housing. Before the handset is inserted, the cradle is in a pivoted first position having its forward end within the housing relatively higher than its opposite or rearward end nearest the housing opening. The pivoting action is readily induced with a coil spring, flat spring or the like. When a handset is inserted into the housing, the forward end of the cradle pivots or rotates toward the housing base and the rearward end of the cradle rises from the housing base to meet the rearward end of the handset. When the handset is fully engaged in the device, the light spring action will rotate the cradle to a neutral position and press the handset against the inner roof surface of the housing. A small anti-rattle tab may be employed here if desired. In this neutral, engaged position, the rearward end of the cradle positions a portion of the handset at a location below the rearward outer lip of the housing. The handset is effectively cradled within the housing and thereby safe from the influence of many inertial forces as described previously. The spring action on the forward end of the cradle presses the cradle and handset toward the roof of the housing yet will readily release the handset upon application of a moderate amount of force by the flight attendant.

This subject handset cradle uses a rotating cup design to hold the handset. By locating the pivot point of the cup at the combined center of gravity of the cup and handset, linear inertial forces in any direction do not cause the cup to rotate and inadvertently release the handset, thus allowing both reduced hand forces for stowage or retrieval while securely retaining the handset at all other times. As such, the cradle may be oriented in any desired direction for installation.

An optional spring loaded latch may be utilized. Such a latch would deploy when the handset is removed from the cradle and hold the cradle in the open position to ease stowage of the handset back into the cradle.

Thus, the present invention provides a cradling system for storage of handheld devices such as a telecommunications device for an aircraft. It provides secure storage with easy insertion and removal of a handset. A further advantage of the system provides firm retention of a handset in a stowed position but the handset is readily deployed and ready for use when needed.

The telecommunications device achieves the foregoing advantages while reducing discomfort from using cradled phones on aircraft, and by reducing the force necessary to lock or release the cradle.

Other objects, features and advantages of the present invention will be apparent when the detailed descriptions of the preferred embodiments of the invention are considered with reference to the accompanying drawings, which should be construed in an illustrative and not limiting sense as follows:

DETAILED DESCRIPTION OF THE PREFERRED EMBODIMENTS

Figure 1:
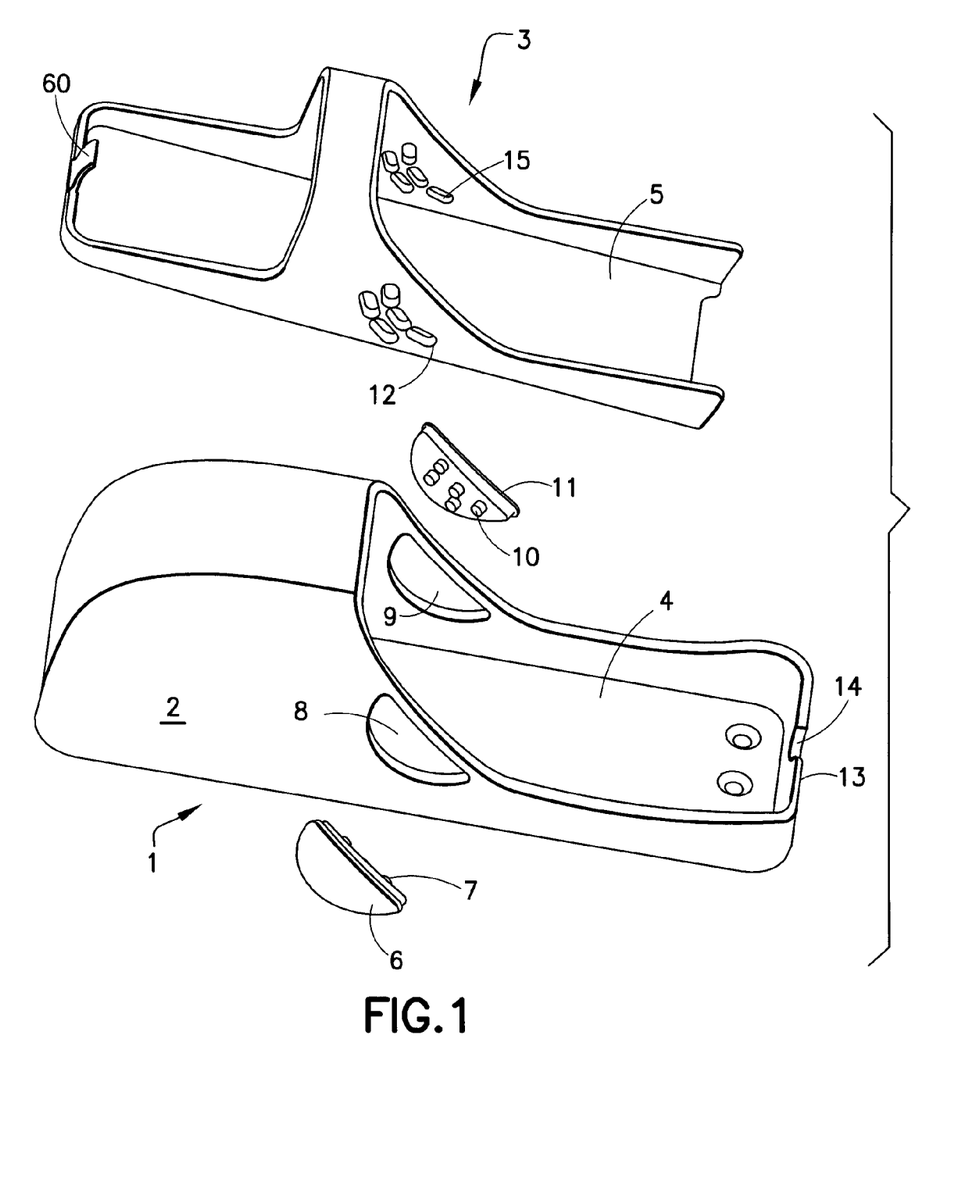
FIG. 1 is a perspective view of the major components of a preferred embodiment of a securable cradle for handheld devices.

FIG. 1 depicts a handset cradle device 1 for securely stowing a handheld device such as a telephone handset. The device includes housing 2, into which handset cradle 3 is inserted. Housing 2 has base 4, and cradle 3 has base 5. The device utilizes a pin and slot arrangement for governing the pivoting motion of the cradle within housing 2. The pins are deployed on symmetrical inserts 6 and 11 which are affixed to opposite sides of housing 2. Each opposite insert 6 and 11 must have at least two pins, otherwise the cradle device would pivot on a single pin at the axis of rotation. It is preferred to use additional pins on each opposite insert 6 and 11 and the figures depict the use of five such pins on each side. For clarity, housing 2 is shown with voids 8 and 9 which receive inserts 6 and 11. If desired, the inserts may be cemented into the housing with suitable adhesive such as curable epoxy resin. Opposite pins 7 and 10 will engage slots 12 and 15 of cradle 3 and will facilitate a limited range of motion for cradle 3, defined by movement of the slots from end to end upon and stopped by the respective pins. The remaining pin and slot combinations work in similar cooperation. Housing 2 also features housing lip 13, which engages the end of a handset when it is inserted in the device and prevents inadvertent removal of the handset from the housing. Slot 14 may be utilized for clearance, if desired, to allow a handset cord to travel from the handset to another part of the device, such as a telecommunication transceiver. Optional tab 60 may be utilized to minimize vibration or rattling within the cradle housing. Screw holes 43 may be utilized to secure the device housing to a surface of a vehicle. It will be recognized that the cradle device may incorporate a magnet or other means for switching off an electronic device when the handheld device is placed into its stowed position.

Figure 2:
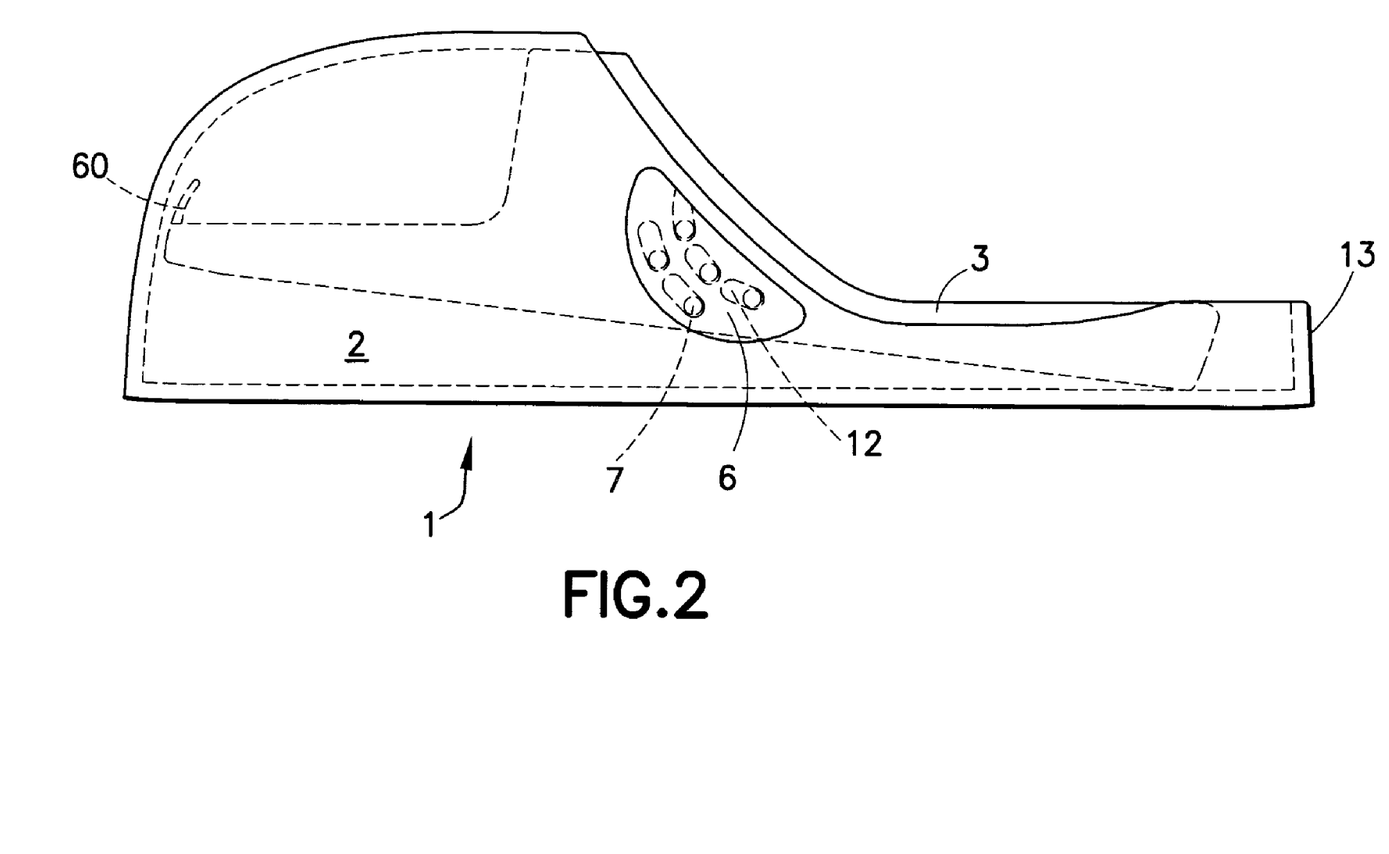
FIG. 2 is a side elevation view of the cradle housing within which a movable cradle is deployed.

FIG. 2 depicts an elevation view in phantom detail of telecommunications device 1 including housing 2 and interior pivoting cradle 3. Also shown is insert 6 featuring exemplary pin 7 and slot 12. Cradle 3 is shown in its loaded configuration, as when the device contains a handset, in which instance housing lip 13 would prevent inadvertent removal of handset 20. Biasing means such as a spring is shown in later figures.

Figure 3:
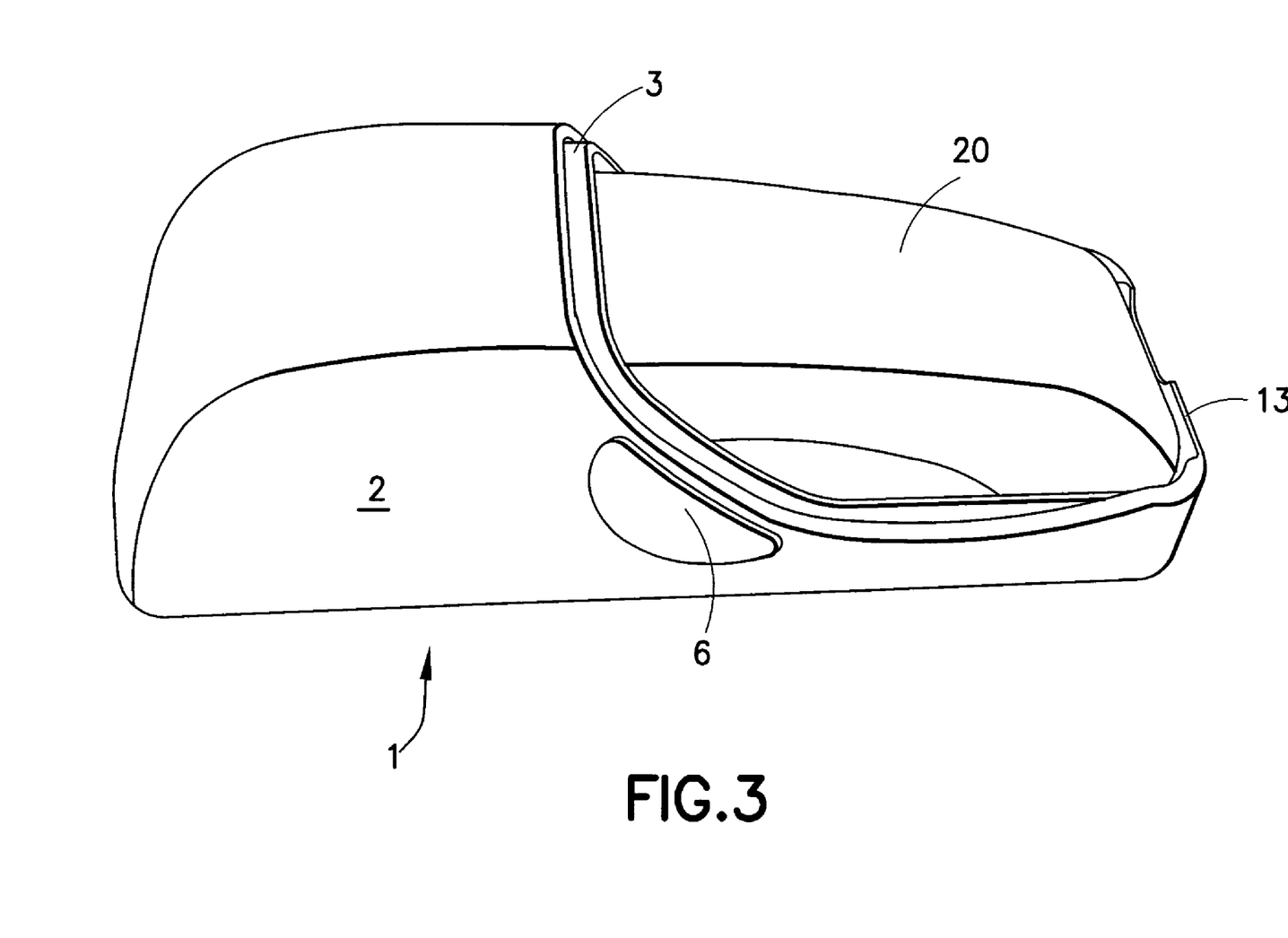
FIG. 3 is a side perspective view of the subject cradle housing with a telecommunications handset secured therein.

FIG. 3 is a perspective view of the telecommunications cradle device 1 holding handset 20 in its neutral locked configuration. Also seen in this view are housing 2, a portion of cradle 3 and housing lip 13. Also seen is insert 6.

Figure 4:
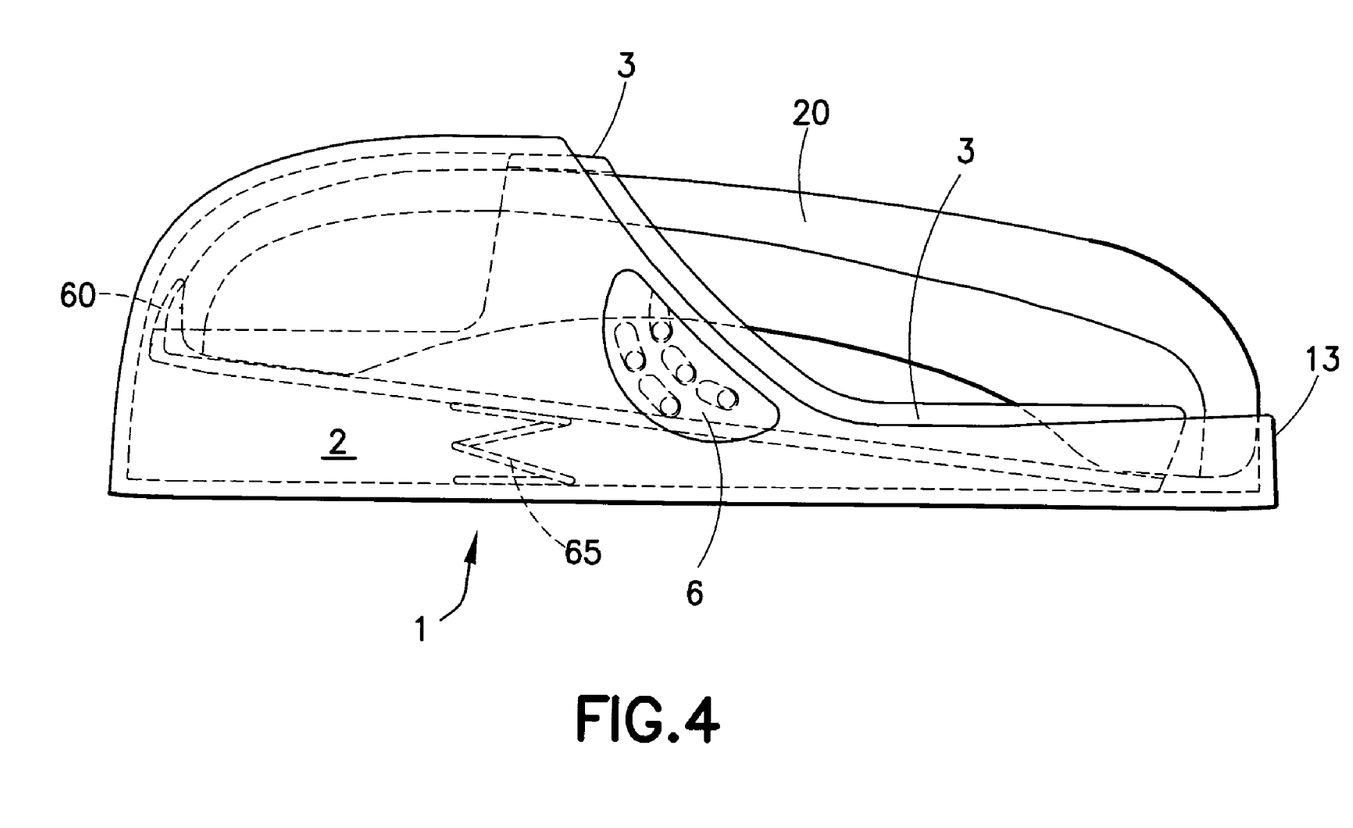
FIG. 4 is a side elevation cutaway view of the cradle housing, the cradle deployed therein and a telecommunications handset secured therein.

FIG. 4 is similar to FIG. 2 but additionally depicts handset 20 inserted in the device and engaged with cradle 3 and housing lip 13. In this view, coil spring 65 imparts a biasing force of approximately a pound between base 4 of housing 2 and the forward end of cradle 3, seen here in its engaged position.

Figure 5:
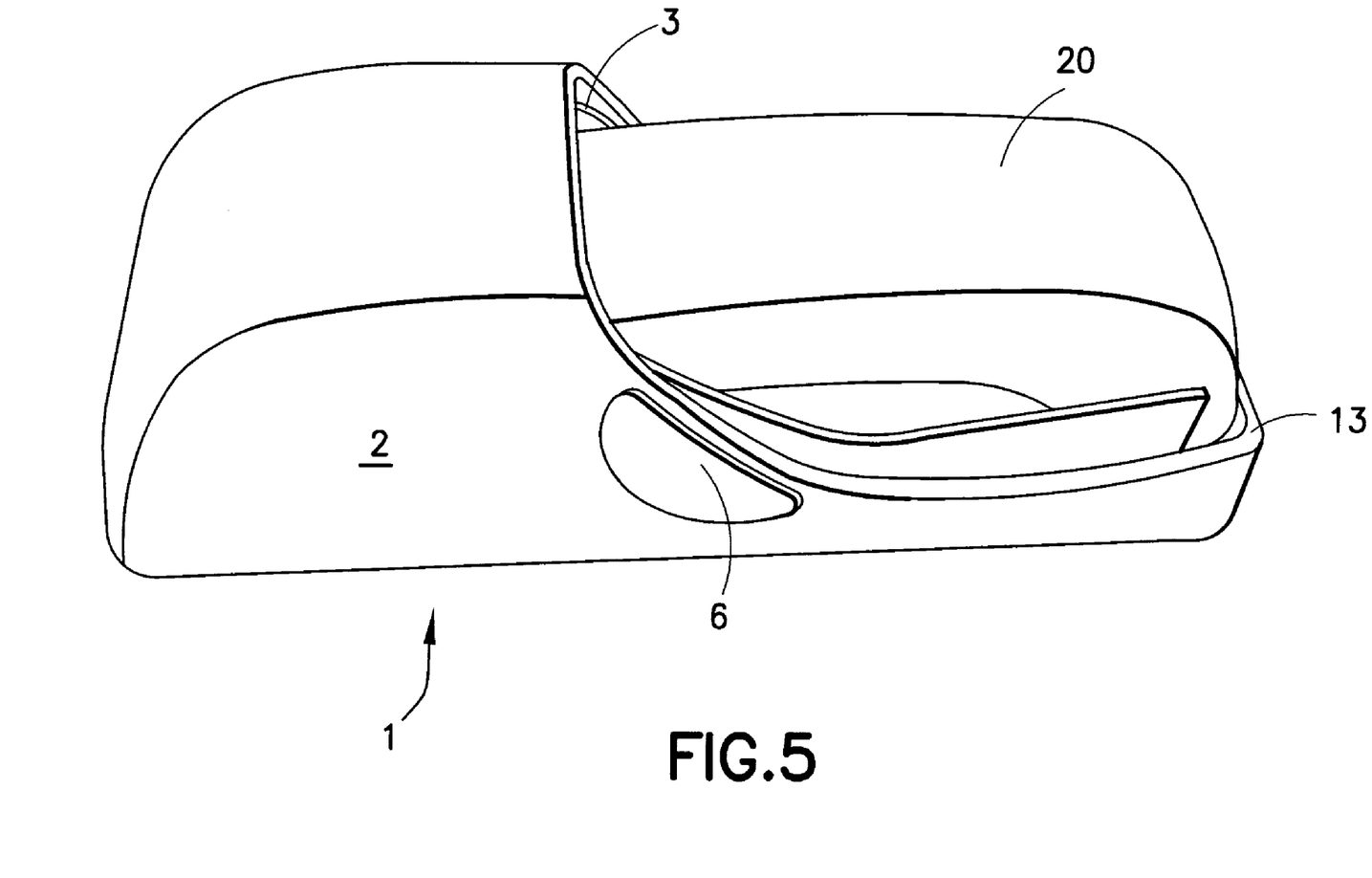
FIG. 5 is a side perspective view of the subject cradle housing with a telecommunications handset ready for release.

FIG. 5 is a perspective view of device 1 containing handset 20 and configured for removal of the handset. By lifting the exposed lower portion of handset 20 away from the device, interior cradle 3 pivots or rotates down within the housing and therefore, in this view, only a small portion of cradle 3 can be seen within the opening of housing 2. Inasmuch as housing lip 13 no longer prevents removal of handset 20, the handset can be easily removed for use.

Figure 6:
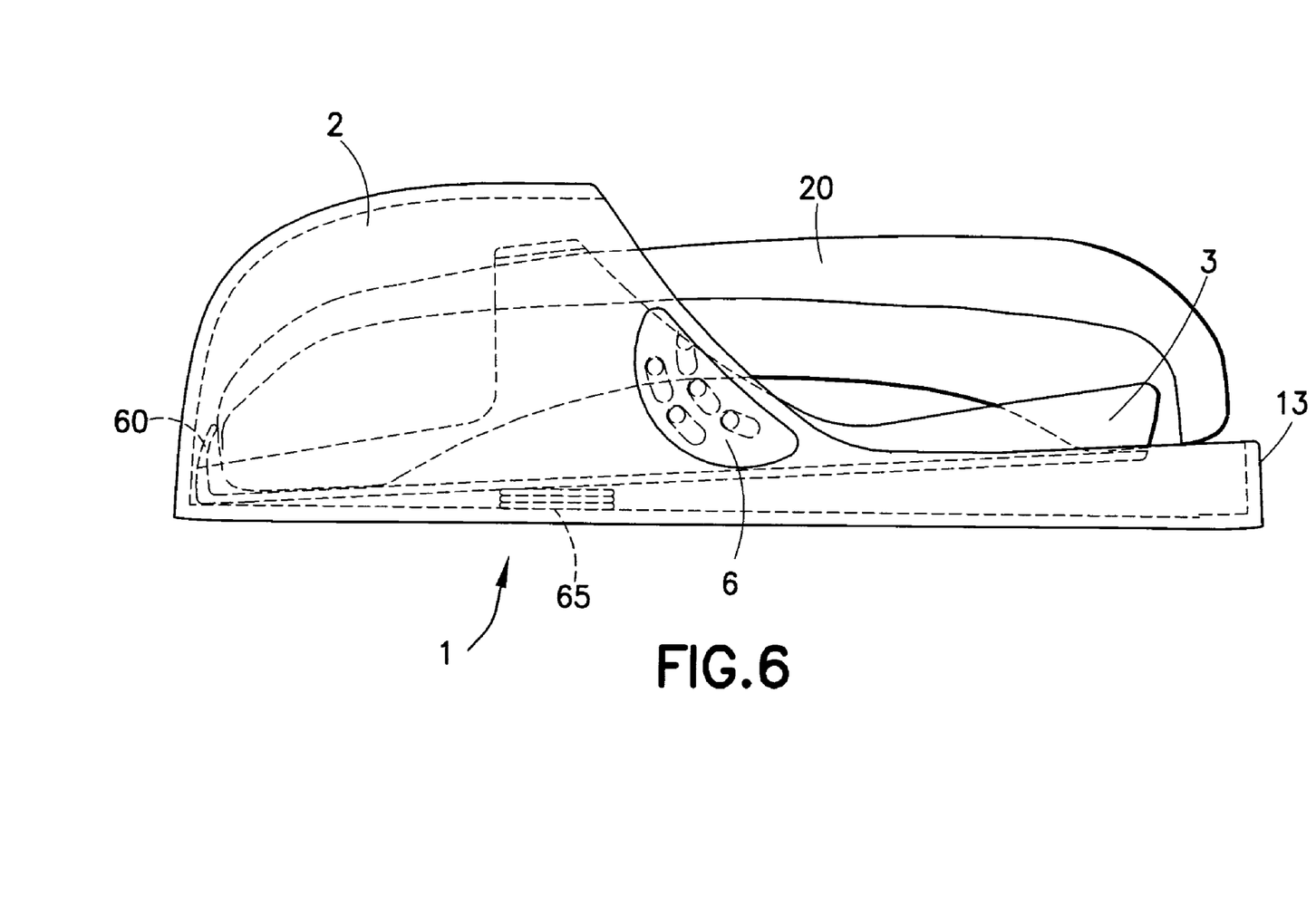
FIG. 6 is a side elevation cutaway view of the cradle housing, the cradle deployed therein and a telecommunications handset ready for release.

FIG. 6 is an elevation view with phantom detail, similar to FIG. 5, showing device 1 containing handset 20. Handset 20 is ready for removal from cradle 3 and is shown with its forward, interior end down within the housing and having its rearward end rotated or pivoted up. In this view, insert 6 depicts the limited range of pivoting action with the pin and slot arrangement described earlier. Coil spring 65 is seen in its compressed position. Again, as seen in FIG. 5, handset 20 can be readily lifted from the device over housing lip 13.

Figure 7:
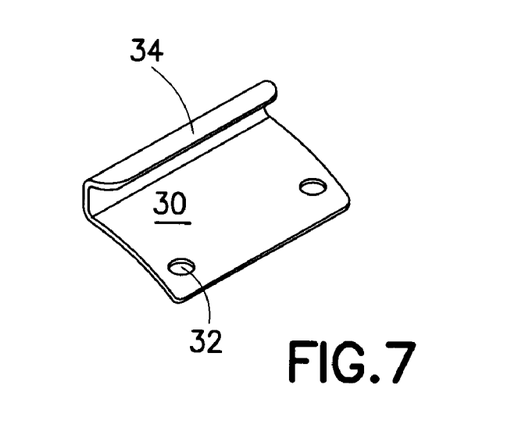
FIG. 7 is a perspective view of a clip for securing the cradle housing to a surface.
Figure 8:
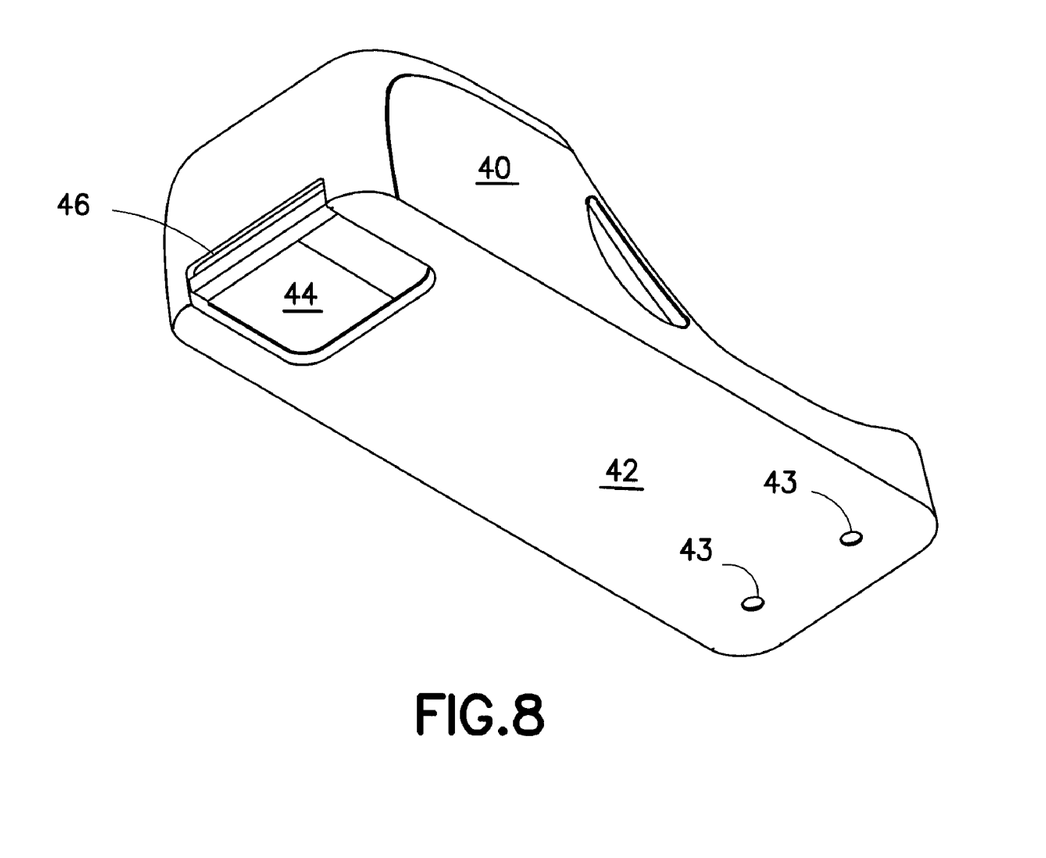
FIG. 8 is a bottom perspective view of the subject cradle.

FIGS. 7 and 8 depict an embodiment for affixing the handset cradle and housing to a secure surface. Clip 30 can be screwed or fastened to a secure surface through holes 32. Clip lip 34 will engage in a slot 46 in the end of device housing 40. In an alternative embodiment, clip 30 can be a spring clip (not shown) which can impress a biasing force through an opening in the base of the cradle housing, in place of the coil spring described above.

FIG. 8 depicts further details of alternative device housing 40 configured for use with the clip arrangement depicted in FIG. 7. Device housing 40 has base 42, screw holes 43, an open area 44 for engaging clip 30 and a slot 46 to engage clip lip 34.

The handset cradle device can be made by a stereo lithography process using a computer-controlled laser to cure a photopolymer resin. In preferred embodiments, the device is molded from thermoplastic or thermosetting resinous materials, typically in an injection molding operation.

Preferred manufacturing techniques will include resin molding operations particularly suited to provide a predictable balance of selected physical properties, particularly weight, strength, durability, and flame retardancy. For example, when molding aircraft telecom devices, particularly preferred resins will be polycarbonate resin such as LEXAN® resin, polyetherimide resin such as ULTEM® resin, both from General Electric, as well as microwave transmissive polytetrafluoroethylene composites such as RAYDEL® composites from Saint-Gobain. Such engineering thermoplastics provide a good combination of strength, weight and fire retardant properties for an aircraft application. Molding composites may combine plastic resins with fibers or woven structural fabrics utilizing fiberglass, aramid, and similar high strength, high temperature resistant materials. In less critical operations, for instance, land or water vehicle installations, other plastics, with or without fillers, might be chosen. Examples of these include nylon, glass-filled nylon or acrylonitrile-butadiene-styrene (ABS) plastic resins.

In an aircraft installation where the device is intended to secure a typical handset, the overall dimensions of the device will be on the order of about 8 inches in length, and about 2.5×2.5 inches in height and width. In such a typical application, the thickness of the plastic used for the housing or the cradle will be approximately 0.08 to 0.16 inches.

The subject cradle device is designed to match a specific complementary handset, but in general, the device, its method of operation and method of manufacture described herein may be used in other applications to accommodate a wide variety of such handset styles and sizes. The figures depict a typical device for containing handheld device, in this case a typical telecom handset. A device as depicted in the figures had a housing base with approximate dimensions of 8.46 in. length, and 2.80 in. width. The corners of the base were gently rounded with a 0.50 in. radius. The height of the device was 2.7 inches. Because the housing had gently rounded edges of 0.50 in., the upper portion of the housing was slightly smaller at 2.60 in. wide by 4.0 in. length, the remainder of the upper housing being open to receive the handset. The thickness of the housing and cradle components was approximately 0.2 inches and generally varies with the materials chosen to manufacture the device within well-known ranges.

Four holes in the corners of the housing base were sufficient to mount the device on a secure surface with four 10-32 screws. Alternatively, the device can be removably mounted to a secure surface with a spring clip and catch arrangement The handset cradle installed within the housing uses a lightly spring loaded rotating cup to hold the handset. The housing also has a fixed lip on one edge of its open end to prevent the handset from sliding out of the cup when in the stowed position. A spring-loaded latch may be optionally utilized to hold the cradle in the open position when the handset is removed and to ease stowage of the handset back into the cradle.

The pivot point of the cradle cup is purposely located at the combined center of gravity of the cup and handset; therefore, linear inertial forces in any direction do not cause the cup to rotate and dislodge the handset. This permits the use of a relatively light spring to keep the cup in the closed position, and thereby also reduces the hand forces necessary for stowage or retrieval, while securely retaining the handset at all other times. For retrieval, the handset is grasped and pulled out slightly, rotating the cup a few degrees. This rotation then allows the handset to clear the housing over the housing lip and slide down and out of the cup. Stowage is the reverse action of retrieval. Changes in load requirements or installation orientation do not affect the cradle's ability to retain the handset, and the device may be deployed in any orientation in an aircraft depending on installation requirements. A cradle device of the present design was loaded with a complementary handset and placed in a centrifuge where it experienced forces of 50 g without dislodging the handset.

In practice, a virtual or geometric pivot allows rotation of the cradle cup within the housing about an axis in space but without a physical axis at the center of rotation. The pivoting mechanism is accomplished by utilizing a series of pins or pegs, in either the housing or cradle, which are engaged in complementary slots in the other work piece. The combination of pins and slots are designed to allow a limited range of rotational motion about a preselected, virtual axis of rotation. The figures described above depict the pins affixed to the housing and the cradle contains the slots. Also, as depicted in the figures, it is preferred that the pins are provided by means of an insert or plug, such as an insert with molded pins. The molded plugs may be securely attached or cemented to the housing and become part thereof, after the movable cradle is installed in the housing. Alternatively, the plugs may be integrally molded into the housing structure.

The pin-slot configuration can be accomplished directly between the housing and the cradle, but it is preferred that the housing include a pair of symmetrical plugs on either side of the housing, where the plugs have the pins to engage the slots in the sidewalls of the cradle. Such plugs may be replaced if the pins become damaged. It will be recognized however, that a designer may choose to use pins on the movable cradle element and engage these pins in slots in the housing structure. The mechanical range of motion is similar in either case.

The pin and slot pairs are arrayed with reference to the geometric point representing the axis of rotation of the cradle cup. In a preferred embodiment discussed above, where each side of the housing has five pin-slot pairs, these may be oriented as follows. Two pairs are located on a circular line located at a first radius from the geometric rotation reference point. The remaining three pairs of pin and slot combinations are placed on a second circular line at a second radius, which is different from the first radius. Thus, when the pins on the housing are engaged in the respective slots on the cradle, there is defined a specific, limited amount of rotational motion about the geometric point and its axis of rotation. More or fewer pin-slot pairs may be utilized in devices having the same general design.

An alternative embodiment of the present design allows retrieval and stowage from either the top or bottom of the cradle, i.e. from either end of the housing. This is accomplished by making the cradle symmetrical about a plane through the pivot axis normal to the mounting plane, making the cup open at both ends, including a lip at both ends, and allowing the cup to pivot in either direction, with a spring centering it.

The invention now being fully described, it will be apparent to one of ordinary skill in the art that many changes and modifications can be made thereto without departing from the spirit or scope of the invention as set forth herein.

The invention claimed is:

1. An apparatus for securing a handheld device in a vehicle comprising:
 a sleeve shaped housing having a base which may be affixed to a secure surface of a vehicle;
 the housing configured to receive and store a specified complementary handheld device until intentionally released by a user;
 the housing further containing a movable interior cradle for the handheld device, the cradle being permitted a limited range of motion about an axis of rotation located near the center of gravity of the combined cradle and handheld device, the limited range of motion defined by a complementary pin and slot configuration arrayed to maintain the center of gravity of the cradle within the housing and near the center of gravity of the handheld device and to provide the axis of rotation of the cradle, whereby the limited range of motion about the axis of rotation minimizes inadvertent release of the handheld device when subjected to inertial forces; and wherein each side of the housing has complementary pin-slot pairs configured with a first at least one pin-slot pair located on a first circular line located at a first radius from the geometric point of rotation and a second at least one pin-slot pair located on a second circular line at a second radius from the geometric point of rotation which is different from the first radius and configured to permit a specific, limited amount of rotational motion about the geometric point and the axis of rotation, the apparatus being effective for accepting, storing and releasing the handheld device as desired by a user.

2. The apparatus of claim 1 further comprising biasing means between the housing base and the movable cradle, and effective for impressing a securing force upon the handheld device in the cradle and housing and permitting ease of release by hand by grasping the end of the handheld device and pulling it free with a rearward, outward motion.

3. The apparatus of claim 2 wherein the biasing means is selected from coil springs, leaf springs, and spring clips.

4. The apparatus of claim 1 wherein the housing is a molded housing having an integral base.

5. The apparatus of claim 1 wherein the housing further comprises a separate base element securely affixed to the housing.

6. The apparatus of claim 1 wherein the axis of rotation of the movable cradle is a geometric pivot point allowing rotation of the cradle within the housing about an axis in space but without a physical axis at the center of rotation and which is located within about 0.25 inch of the center of gravity of the combined cradle and complementary handset assembly.

7. The apparatus of claim 1 wherein at least two pin and slot pairs are used on each opposite side of the apparatus to engage the housing to the interior movable cradle.

8. The apparatus of claim 7 wherein 5 pairs of complementary pins and slots are used on each opposite side of the device to engage the housing to the interior movable cradle.

9. The apparatus of claim 1 wherein the pins are contained on opposite inner surfaces of the housing.

10. The apparatus of claim 1 wherein the pins are contained on molded plugs which are inserted in opposite housing sides.

11. The apparatus of claim 1 wherein the slots are symmetrically arranged on both opposite sides of the cradle and oriented to engage complementary pins on the interior surface of the housing.

12. The apparatus of claim 1 wherein the apparatus is molded from thermoplastic or thermosetting resin.

13. The apparatus of claim 12 wherein the resin is fiber-filled.

14. The apparatus of claim 12 wherein the resin is selected from polycarbonate, polyetherimide, polytetrafluoroethylene, nylon and acrylonitrile-butadiene-styrene resins.

15. The apparatus of claim 1 wherein the vehicle is an aircraft.

16. The apparatus of claim 1 wherein the handheld device is selected from the group consisting of telecommunications handsets, radios, handheld tools, flashlights and remote controls.

17. The apparatus of claim 1 further comprising means for minimizing vibration of the cradle within the housing.

18. The apparatus of claim 1 wherein the slots are symmetrically arranged on both opposite sides of the housing and oriented to engage the pins on the outboard surface of the movable interior cradle.

19. A method for securing a handheld device in a vehicle comprising the steps of:
inserting the handheld device in a sleeve shaped housing having a base which may be affixed to a secure surface of a vehicle; the housing configured to receive and store a specified complementary handheld device until intentionally released by a user; the housing further containing a movable interior cradle for the handheld device, the cradle being permitted a limited range of motion about an axis of rotation located near the center of gravity of the combined cradle and handheld device, the limited range of motion defined by a complementary pin and slot configuration arrayed to maintain the center of gravity of the cradle within the housing and near the center of gravity of the handheld device and to provide the axis of rotation of the cradle, whereby the limited range of motion about the axis of rotation minimizes inadvertent release of the handheld device when subjected to inertial forces; wherein each side of the housing has complementary pin-slot pairs configured with a first at least one pin-slot pair located on a first circular line located at a first radius from the geometric point of rotation and a second at least one pin-slot pair located on a second circular line at a second radius from the geometric point of rotation which is different from the first radius and configured to permit a specific, limited amount of rotational motion about the geometric point and the axis of rotation;
storing the handheld device without inadvertently dislodging the device; and
releasing the handheld device as desired by a user.

* * * * *